United States Patent
Gozen et al.

(10) Patent No.: US 10,253,163 B1
(45) Date of Patent: Apr. 9, 2019

(54) AZODICARBOXY ADDITIVES FOR RUBBER COMPOSITIONS

(71) Applicant: Bridgestone Corporation, Tokyo (JP)

(72) Inventors: Arif O. Gozen, Akron, OH (US); Christopher G. Robertson, Akron, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 613 days.

(21) Appl. No.: 13/915,063

(22) Filed: Jun. 11, 2013

Related U.S. Application Data

(60) Provisional application No. 61/658,143, filed on Jun. 11, 2012.

(51) Int. Cl.
| | | |
|---|---|---|
| *C08K 5/23* | (2006.01) | |
| *C08K 13/02* | (2006.01) | |
| *C08K 3/04* | (2006.01) | |
| *C08K 3/36* | (2006.01) | |

(52) U.S. Cl.
CPC ............... *C08K 5/23* (2013.01); *C08K 3/04* (2013.01); *C08K 3/36* (2013.01); *C08K 13/02* (2013.01)

(58) Field of Classification Search
CPC ...................................................... C08K 5/23
See application file for complete search history.

(56) References Cited

U.S. PATENT DOCUMENTS

| | | | |
|---|---|---|---|
| 4,029,612 A | 6/1977 | Collington | |
| 4,247,412 A | 1/1981 | Ohno et al. | |
| 4,714,568 A | 12/1987 | Hurnik et al. | |
| 5,788,786 A | 8/1998 | Yamauchi et al. | |
| 7,053,137 B2 | 5/2006 | Stieber et al. | |
| 2004/0152809 A1* | 8/2004 | Stieber | B60C 1/00 524/190 |
| 2008/0188621 A1* | 8/2008 | Ichino | B60C 1/0016 525/232 |
| 2009/0176903 A1* | 7/2009 | Muenz | C08J 9/0061 521/91 |
| 2010/0036006 A1* | 2/2010 | Ota | B60C 1/0016 521/55 |
| 2010/0071818 A1* | 3/2010 | Hergenrother | C08G 77/26 152/209.1 |

OTHER PUBLICATIONS

Hoffman, H.M.R., "The Ene Reaction", In Angewandte Chemie International Edition, vol. 8, No. 8, 1969, pp. 556-577.
(Continued)

*Primary Examiner* — Ryan M Ochylski
(74) *Attorney, Agent, or Firm* — Meredith E. Hooker; Nathan T. Lewis

(57) ABSTRACT

A polymeric composition includes a diene elastomer; an azodicarboxy compound; and a reinforcing filler comprising silica. The composition is not foamed. A method for preparing a polymeric composition includes mixing in one or more steps: a diene elastomer; an azodicarboxy compound; and a reinforcing filler. The mixing temperature is less than 160° C. in mixing steps in which the azodicarboxy compound is present. In an embodiment, the mixing temperature is kept below the decomposition temperature of the azodicarboxy compound.

11 Claims, 1 Drawing Sheet

(56) References Cited

OTHER PUBLICATIONS

Maffei, Mario, "Characterization of Foaming Phenomena of Polypropylene Filled with Azodicarbonamide and Silica", University of Akron Masters Thesis, Dec. 2006, 254 pages.

Sombatsompop, et al., "Effects of Chemical Blowing Agents on Swelling Properties of Expanded Elastomers", In Journal of Elastomers and Plastics, vol. 32, Oct. 2000, pp. 311-328.

Kim, et al., "Effects of Foaming Temperature and Carbon Black Content on the Cure Characteristics and Mechanical Properties of Natural Rubber Foams", In Journal of Industrial and Engineering Chemistry, vol. 13, No. 2, 2007, pp. 198-205.

Lawindy, et al., "Physical Studies of Foamed Reinforced Rubber Composites Part I. Mechanical Properties of Foamed Ethylene-Propylene-Diene Terpolymer and Nitrile-Butadiene Rubber Composites", In Polymer International, vol. 51, 2002, pp. 601-606.

Kim, et al., "The Foaming Characteristics and Physical Properties of Natural Rubber Foams: Effects of Carbon Black Content and Foaming Pressure", In Journal of Industrial and Engineering Chemistry, vol. 12, No. 5, 2006, pp. 795-801.

Hergenrother, et al., "Use of X as a Function of Volume Fraction of Rubber to Determine Crosslink Density by Swelling", In Rubber Chemistry and Technology, vol. 76, 2003, pp. 832-845.

Hergenrother, et al., "Determination of the Molecular Weight Between Cross-Links of Elastomeric Stocks by Tensile Retraction Measurements I.SBR Vulcanizates", In Journal of Applied Polymer Science, vol. 32, 1986, pp. 3039-3050.

Icod Associates LLC, "Blowing Agents" reprinted from H. Lasman, Enc. of Polym. Sci. & Tech. (retrieved on Jun. 30, 2016 from http://www.icodassociates.com/docs/blowing_agents.pdf).

Wang, et al., "Effects of Different Process Parameters on Rubber Mixing in Tandem Internal Mixer", In Key Engineering Materials, vol. 651, Jul. 15, 2013, pp. 186-191.

* cited by examiner

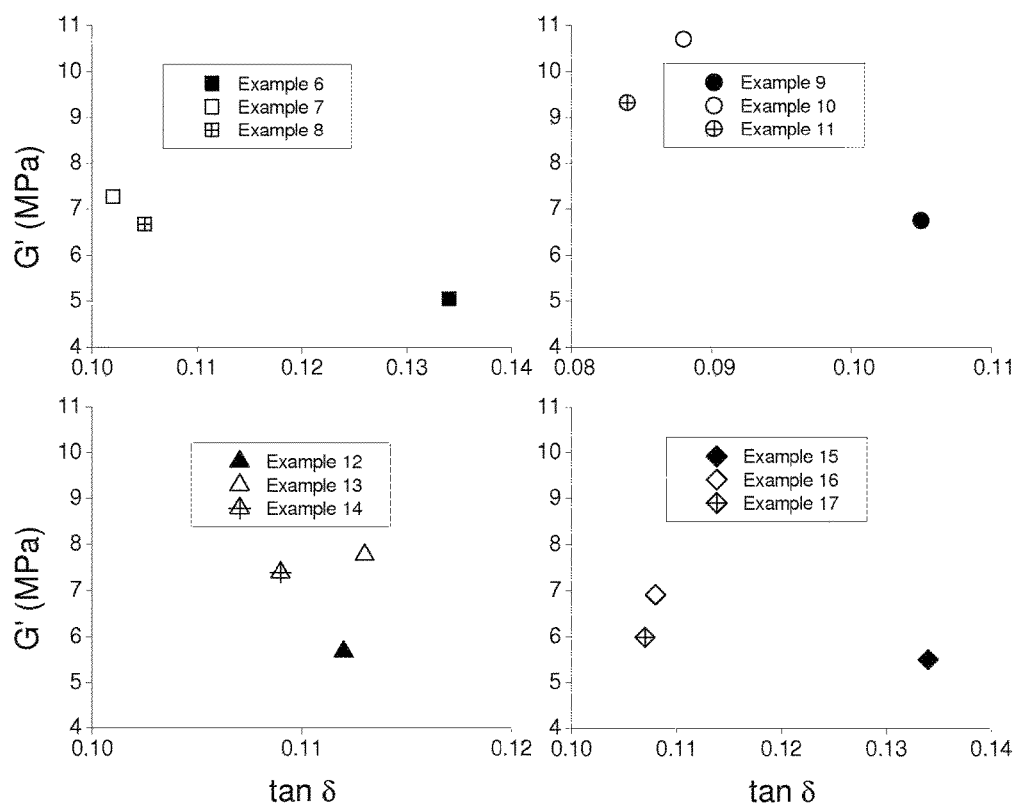

AZODICARBOXY ADDITIVES FOR RUBBER COMPOSITIONS

CROSS-REFERENCE TO RELATED APPLICATIONS

This application claims the benefit of priority of U.S. provisional application titled "Azodicarboxy Additives for Rubber Compositions," filed on Jun. 11, 2012, having the Ser. No. 61/658,143, which is incorporated by reference herein for all purposes.

FIELD

This disclosure relates to rubber compositions and pneumatic tires using the same.

BACKGROUND

Azodicarboxy containing compounds, such as azodicarbonamide, have been used as food additives and as blowing agents for polymer compositions. In this use, the azodicarbonamide is added along with other additives to an uncured polymer matrix. The composition is then heated to a temperature high enough to decompose the azodicarbonamide into gaseous products as the composition cures. Zinc containing compounds have also been taught to aid in the decomposition of the azodicarbonamide. Decomposition of the azodicarbonamide causes gas to be trapped in the cured polymer composition, which results in a foamed polymeric product.

SUMMARY

In an embodiment, a composition includes a diene elastomer; an azodicarboxy compound; and a reinforcing filler comprising silica.

In an embodiment, a method for preparing a rubber composition includes mixing in one or more steps: a diene elastomer; an azodicarboxy compound; and a reinforcing filler, wherein the composition is not foamed. In an embodiment, the mixing temperature is less than 160° C. in mixing steps in which the azodicarboxy compound is present. The elastomer, azodicarboxy compound, and reinforcing filler may be added in the same mixing step or different mixing steps.

A method for preparing a rubber composition comprising mixing a diene elastomer, an azodicarboxy compound, and a reinforcing silica filler. The mixing temperature is kept below the decomposition temperature of the azodicarboxy compound. The elastomer, azodicarboxy compound, and reinforcing filler may be added in the same mixing step or different mixing steps.

As used herein the terms "a" and "the" mean one or more, unless the context clearly indicates to the contrary.

BRIEF DESCRIPTION OF THE DRAWINGS

The sole FIGURE is a graph depicting the relationship between G' and tan delta in the Example 6-17 rubber compositions.

DETAILED DESCRIPTION

In an embodiment disclosed herein, it was unexpectedly discovered that azodicarboxy additives can promote improvements in diene rubber compositions without mixing at high temperatures that would cause them to decompose into gaseous products. It was also unexpectedly discovered that azodicarboxy additives can promote polymer interaction with silica filler in rubber compositions. Although not limited to this theory, it is believed that as the azodicarboxy compound reacts with a diene rubber, the azodicarboxy group is activated to interact with silanol groups on the silica filler. This is in contrast to the previous approach where azodicarbonamide was heated to its decomposition temperature, thereby destroying the azo group, creating gaseous byproducts, and increasing stability of the compound rather than promoting reactivity.

In an embodiment, the azodicarboxy group used in a silica filled composition exhibited a positive effect on the interaction between the silica particles and the polymer. Bound rubber content was shown to increase and at 60° C. the polymer network stiffened due to the increased polymer-filler interaction, yet surprisingly the loss tangent (tan delta) at 60° C. was reduced. This is in contrast to most additive technologies wherein a reduction in rolling resistance (reduction in tan delta at 60° C.) causes a negative effect on handling/cornering (reduced G').

In an embodiment the azodicarboxy additive has the structure of formula I:

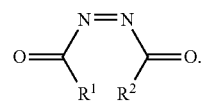

wherein $R^1$ and $R^2$ are independently selected from hydrogen, or oxygen-, sulfur-, carbon- or nitrogen-containing compounds, such as, for example, OH, $NH_2$, $NHR^3$, $NR^3$, $OR^3$ where $R^3$ is a branched or linear alkyl, aryl, or akylaryl group having 1 to 16 carbon atoms. In an embodiment, the azodicarboxy additive is an azodicarbonamide; N, N' dialkyl azodicarbonamide; N, N, N',N' tetra alkyl azodicarbonamide; methyl, ethyl i-propyl and benzyl esters of dialkyl azodicarboxylates; and the dialdehyde or diketones of diazo dicarbonyls.

In an embodiment, the diene elastomer may be selected from the following, individually as well as in combination: natural rubber, polyisoprene rubber, styrene butadiene rubber, polybutadiene rubber, poly(isoprene-styrene), poly(isoprene-butadiene), poly(isoprene-styrene-butadiene), neoprene, ethylene-propylene-diene rubber (EPDM), acrylonitrile-butadiene rubber (NBR), as such terms are employed in The Vanderbilt Rubber Handbook, Thirteenth Edition, (1990). These elastomers may contain a variety of functional groups, including but not limited to tin, silicon, and amine containing functional groups. The rubber polymers may be prepared by emulsion, solution, or bulk polymerization according to known suitable methods. In an embodiment, the composition is exclusive of any thermoplastic polymers.

In an embodiment containing a blend of more than one diene elastomer, the ratios (expressed in terms parts per hundred rubber (phr)) of such elastomer blends can be adjusted according to the desired final viscoelastic properties desired for the rubber compound. For example, in an embodiment, natural rubber or polyisoprene may comprise about 5 to about 80 phr, such as about 20 phr to about 60 phr, or about 35 phr to about 55 phr; and polybutadiene or styrene-butadiene rubber may comprise about 60 phr to about 5 phr, such as about 50 phr to about 10 phr, or about 15 phr to about 25 phr.

In an embodiment, the diene elastomer may have a number average molecular weight (Mn) of about 100,000 to about 1,000,000, such as about 150,000 to about 600,000, or about 250,000 to about 500,000. In an embodiment, the polydispersity of the diene elastomer (Mw/Mn) may range from about 1.2 to about 6.0, such as about 1.5 to about 5.0, or about 2.0 to about 4.0.

In an embodiment, the reinforcing filler may be selected from the group consisting of carbon black, silica, and mixtures thereof. The total amount of reinforcing filler may be from about 1 to about 100 phr, from about 30 to about 80 phr, from about 40 to about 70 phr, or from about 50 to about 100 phr of filler.

Carbon black, when present, can be present in amounts ranging from about 1 to about 80 phr, such as about 5 to about 60 phr, or about 20 to about 50 phr. The carbon black may have a surface area (EMSA) of at least about 20 $m^2/g$ and, such as at least about 35 $m^2/g$ up to about 200 $m^2/g$ or higher. Surface area values used in this application are determined by ASTM D-1765 using the cetyltrimethylammonium bromide (CTAB) technique.

Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. Exemplary carbon blacks include, but are not limited to, N-110, N-220, N-339, N-330, N-352, N-550, and N-660, as designated by ASTM D-1765-82a.

A mixture of two or more of the above blacks can be used in preparing the carbon black filled embodiments. The carbon blacks utilized in the preparation of the vulcanizable elastomeric compositions can be in pelletized form or an unpelletized flocculent mass.

Examples of reinforcing silica fillers that may be used in rubber composition include wet silica (hydrated silicic acid), dry silica (anhydrous silicic acid), calcium silicate, and the like. Among these, precipitated amorphous wet-process, hydrated silicas are preferred. Silica can be employed in an amount of about 1 to about 100 phr, in an amount of about 5 to 80 phr, in an amount of about 40 to about 100 phr, or in an amount of about 30 to about 80 phr. The useful upper range is limited by the high viscosity imparted by fillers of this type. Some of the commercially available silicas that can be used include, but are not limited to, HiSil® 190, HiSil® 210, HiSil® 215, HiSil® 233, and HiSil® 243, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

The surface area of the silicas, may for example, be about 32 $m^2/g$ to about 400 $m^2/g$, such as about 100 $m^2/g$ to about 250 $m^2/g$, or about 150 $m^2/g$ to about 220 $m^2/g$. The pH of the silica filler is generally about 5.5 to about 7 or slightly over, preferably about 5.5 to about 6.8.

If silica is used as a filler, it may be desirable to use a coupling agent to couple the silica to the polymer. Numerous coupling agents are known, including but not limited to organosulfide polysulfides. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl) trisulfide, 3,3'-bis(methylbutylethoxysilylpropyl)tetrasulfide, 3,3'-bis(di t-butylmethoxysilylpropyl) tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyldisecbutoxysilylpropyl)disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide, and 3-octanoylthio-1-propyltriethoxysilane (NXT). Mixtures of various organosilane polysulfide compounds can be used.

The amount of coupling agent in the composition is based on the weight of the silica in the composition. The amount of coupling agent present in the composition may be from about 0.1% to about 20% by weight of silica, from about 1% to about 15% by weight of silica, or from about 2% to about 10% by weight of silica. For example, typical amounts of coupling agents include about 1 to about 10 phr, such as about 4 to about 8 phr.

When both carbon black and silica are employed in combination as the reinforcing filler, they may be used in a carbon black-silica ratio of about 5:1 to about 1:5, such as about 2:1 to about 1:2, or about 1:1 to about 1:2. In an embodiment, silica is the majority of the reinforcing filler component.

Certain additional fillers may also be utilized, including mineral fillers, such as clay, talc, aluminum hydrate, aluminum silicate, magnesium silicate, aluminum hydroxide and mica. The foregoing additional fillers are optional and can be utilized, for example, in the amount of about 0.5 phr to about 40 phr.

Zinc containing compounds, such as zinc oxide or zinc stearate, may be included in the composition in amounts, such as about 0.1 to about 10 phr, about 1 phr to about 5 phr, or about 2 phr to about 4 phr.

A vulcanizing (or curing) agent is also included in the rubber composition. Examples of the vulcanizing agent include sulfur and sulfur donating compounds. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. The amount of the vulcanizing agent used in the rubber composition may be from 0.1 to 10 parts by weight, or from 1 to 5 parts by weight per 100 parts by weight of the rubber component. Specific examples include about 0.1 to about 10 phr, such as about 0.25 to about 3 phr, or about 0.5 to about 2 phr.

A vulcanization accelerator is also included. Numerous accelerators are known in the art and include, but are not limited to, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), 2-(morpholinothio) benzothiazole (MBS). Example amounts of accelerators include about 0.1 to about 10 phr, such as about 0.25 to about 3 phr, about 1 phr to about 5 phr, or about 0.5 to about 2 phr. More than one accelerator may also be used. A conventional Oil may be used as a compounding aid in rubber compositions. Examples of oil include, for example, aromatic, naphthenic, and/or paraffinic processing oils. In some applications, it may be preferable to use low-polycyclic-aromatic (PCA) oils, particularly oils that have a PCA content of less than 3%. A typical amount of oil in a composition may broadly range from about 0 phr to about 100 phr, from about 2 phr to about 70 phr, or from about 10 phr to about 50 phr, such as about 15 phr, about 20 phr, or about 30 phr, and ranges including these endpoints, based on 100 phr rubbery matrix in the rubber composition.

Additional rubber compounding ingredients may also be added that are selected from the group consisting of tackifier resin, antioxidant, fatty acids, wax, peptizer, vulcanization retarder, activator, processing additive, plasticizer, pigments, and antiozonant. Generally, these components may each be included in amounts from about 0.1 to about 15 phr, such as from about 0.5 to about 5 phr, or about 1 phr to about 3 phr.

In an embodiment, the rubber composition including the azodicarboxy compound exhibits an increase in the overall elastic modulus (G') and a decrease in the loss of tan delta at high strain values. For example, the rubber composition may exhibit an improvement in G' [temperature sweep, 60° C., 2%, 10 Hz] of about 1 to about 100 percent, such as about 5 to about 60 percent, or about 35 to about 70 percent over a control composition that is the same with the exception that it does not include the azodicarboxy compound. For example, the rubber composition may exhibit a decrease in tan delta [temperature sweep, 60° C., 10 Hz, 5%] of about 1 to about 75 percent, such as about 3 to about 25 percent, or about 15 to about 35 percent over a control composition that is the same with the exception that it does not include the azodicarboxy compound.

The rubber composition including the azodicarboxy compound may be compounded using standard rubber mixing equipment. Generally, a method for preparing the rubber composition includes: mixing in one or more mixing steps a diene elastomer, an azodicarboxy compound, and a reinforcing filler. The elastomer, azodicarboxy compound, and reinforcing filler may be added in the same mixing step or different mixing steps. In an embodiment, in mixing steps in which the azodicarboxy compound is present the mixing temperature is to be kept less than 160° C.

Generally, mixing of components is accomplished in an internal mixer such as a Brabender or a Banbury mixer, and because of the shear forces involved, the formulation process generally is exothermic and high temperatures may be reached. In the method described herein, care should be taken to avoid such high temperatures that would cause the azodicarboxy compound to unnecessarily destabilize the compound or decompose it into gaseous products. For example, in an embodiment, mixing stage temperatures of 160° C. or higher, such as 180° C. or higher should be avoided.

In one embodiment, a rubber composition is prepared by the steps of (a) mixing together at a temperature of less than 160° C., such as about 60° C. to about 140° C., or about 80° C. to about 120° C. (drop temperature) in the absence of added sulfur and cure agents, the diene elastomer, any other polymers, a reinforcing filler, such as silica and/or carbon black, and a filler coupling agent, (b) allowing the mixture to cool below the mixing temperature; (c) mixing the mixture obtained in step (b), at a temperature corresponding to the ranges given for step (a), with a cure agent and an effective amount of sulfur to achieve a satisfactory cure; and (d) curing the mixture obtained in step (c). The compound may be cured at about 150° C. to about 190° C., such as about 160° C. to about 180° C., or about 165° C. to about 175° C., for about 5 to about 120 minutes, such as about 10 minutes to about 30 minutes depending on the temperature. In an embodiment, the mixture temperature is to be kept below the decomposition temperature of the unreacted azodicarboxy compound in the curing stage. In the case of azodicarbonamide the decomposition temperature is 195° C. to 205° C.

In an embodiment, the diene elastomer, a first amount of reinforcing filler, and azodicarboxy compound are added in a first (masterbatch) mixing step, and a second amount of reinforcing filler is added in a remill mixing step. Polymer-filler coupling agent may be added in either or both the first mixing step or the remill mixing step.

The first mixing step can optionally include at least two sub-steps: (i)(sub-step 1) mixing together at a temperature of less than 180° C., such as less than 160° C., such as about 60° C. to about 140° C., or about 80° C. to about 120° C. (drop temperature) the diene elastomer and any other polymers, along with a portion of the filler, (ii) cooling the mixture below the mixing temperature; and (iii)(sub-step 2) mixing the mixture obtained in step (ii) with the remainder of the filler, if any. The temperatures achieved by the at least two sub-steps can be the same or different from each other, within the temperature range stated above.

The method can further comprise a remill step in which either no ingredients are added to the first mixture, or only non-curing, non-polymeric, and non-filler ingredients are added. The remill step may reduce the compound viscosity and improve the dispersion of the reinforcing filler. The drop temperature of the remill step is a temperature of less than 180° C., such as less than 160° C., about 60° C. to about 140° C., or about 80° C. to about 120° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C. and is typically about 40° C. to about 120° C., about 60° C. to about 110° C., or about 75° C. to about 100° C.

In an embodiment, the first mixing step (or masterbatch stage) does not include the azodicarboxy compound, which is added in the second step or remill step. Thus, the temperature concerns mentioned above are not an issue in the first mixing stage. In this embodiment, the mixing temperature of the first stage may exceed about 160° C., about 180° C., or even the decomposition temperature of the azodicarboxy compound, an example mixing temperature for this mixing stage that excludes the azodicarboxy compound is about 160° C. to about 220° C.

In an embodiment of the method described herein, in contrast to teachings in the prior art, it was found that the azodicarboxy compound could be added in the same mixing stage with zinc compounds, such as zinc oxide.

In an embodiment of the method of making the rubber composition comprising an azodicarboxy compound, the diene elastomer and azodicarboxy compound are mixed with silica filler. The mixing and curing temperature should be kept below the decomposition temperature of the azodicarboxy compound. At least in mixing steps in which the azodicarboxy compound is present.

After the final mixing stage, the filled polymeric composition may be molded and cured to form a rubber product. Example final products include tires, power belts, and vibration isolators. Tires include both pneumatic radial tires as well as pneumatic bias ply tires. In embodiments, the composition is a vulcanizable elastomeric composition that can be utilized to form treadstocks for such tires. Pneumatic tires can, for example, be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components, such as subtreads, black sidewalls, body ply skims, or bead fillers.

Further embodiments are described in the following examples.

EXAMPLES

Examples 1-4

Four diene elastomers were obtained. Example 1 was a polybutadiene with a 95% cis content, polymerized with a lithium catalyst. Example 2 was a high-cis polybutadiene synthesized by a neodymium (anionic) polymerization. Example 3 was a high-cis polyisoprene with a 98% cis content. Example 4, was a random copolymer of butadiene and styrene (SBR) synthesized by lithium catalyzed anionic polymerization, and having a 24% styrene content and a 13% vinyl content.

Example 5

The azodicarboxy compound, azodicarbonamide (CELOGEN AZ120 by Uniroyal Chemical Company) was obtained in an odorless, orange semi-crystalline, orange powder form. The azodicarbonamide was determined to have a decomposition temperature of 195 to 205° C. and a particle size of about 5 microns.

Examples 6-17

Twelve rubber compositions were prepared incorporating the diene elastomers of Examples 1-4. In Examples 7, 8, 10, 11, 13, 14, 16, and 17, 5 phr of the azodicarbonamide of Example 5 replaces 5 phr of the polymer or is used as an over-the-top addition: 95 phr polymer/5 phr and 100 phr polymer/5 phr azodicarbonamide, respectively. Examples 6, 9, 12, and 15 are control examples with no azodicarboxy compound. For each of Examples 6-17, the phr amounts of the polymers, azodicarbonamide, silica and the other curative ingredients are tabulated in Table 1-4.

TABLE 1

|  | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| Example 1 (phr) | 100 | 95 | 100 | — | — | — | — | — | — | — | — | — |
| Example 2 (phr) | — | — | — | 100 | 95 | 100 | — | — | — | — | — | — |
| Example 3 (phr) | — | — | — | — | — | — | 100 | 95 | 100 | — | — | — |
| Example 4 (phr) | — | — | — | — | — | — | — | — | — | 100 | 95.0 | 100 |
| Example 5 (phr) (Azodicarbonamide) | — | 5 | 5 | — | 5 | 5 | — | 5 | 5 | — | 5 | 5 |

TABLE 2

| Control Examples 6, 9, 12, 15 | | Examples 7, 10, 13, and 16 | | Examples 8, 11, 14, and 17 | |
|---|---|---|---|---|---|
| (phr) | | (phr) | | (phr) | |
| Master Batch | | Master Batch | | Master Batch | |
| Elastomer | 100 | Elastomer | 95 | Elastomer | 100 |
| Silica (HiSil 190 PPG)) | 52.5 | Silica (HiSil 190 PPG) | 52.5 | Silica (HiSil 190 PPG) | 52.5 |
| Oil (BO300 Hyprene) | 10 | Oil (BO300 Hyprene) | 10 | Oil (BO300 Hyprene) | 10 |
| Zinc Oxide | 2.5 | Zinc Oxide | 2.5 | Zinc Oxide | 2.5 |
| Wax | 2 | Wax | 2 | Wax | 2 |
| Stearic Acid | 2 | Stearic Acid | 2 | Stearic Acid | 2 |
| A.O. | 1 | A.O. | 1 | A.O. | 1 |
|  |  | Azodicarbonamide | 5 | Azodicarbonamide | 5 |
| Remill | | Remill | | Remill | |
| Master Batch | 170 | Master Batch | 170 | Master Batch | 175 |
| Silica (HiSil 190 PPG) | 2.5 | Silica (HiSil 190 PPG) | 2.5 | Silica (HiSil 190 PPG) | 2.5 |
| Silane | 5 | Silane | 5 | Silane | 5 |
| Final Batch | | Final Batch | | Final Batch | |
| Remill Batch | 177.5 | Remill Batch | 177.5 | Remill Batch | 182.5 |
| MBTS Accel. | 2 | MBTS Accel. | 2 | MBTS Accel. | 2 |
| Sulfur | 1.5 | Sulfur | 1.5 | Sulfur | 1.5 |
| TBBS Accel. | 0.7 | TBBS Accel. | 0.7 | TBBS Accel. | 0.7 |
| DPG Accel. | 1.4 | DPG Accel. | 1.4 | DPG Accel. | 1.4 |

Compounding was performed in three stages: master, remill, and final in a 300-gram Brabender mixer. The mixing details of each step are listed in Table 3:

TABLE 3

| | RPM | Initial T (° C.) | Drop T (° C.) | Roll T (° C.) | Total Mixing Time (min) |
|---|---|---|---|---|---|
| MASTER | 60 | 90-95 | 130-140 | 60 | 6.0 |
| REMILL | 50 | 100-105 | 120-125 | 60 | 3.5 |
| FINAL | 40 | 60-65 | 90-95 | 60 | 2.5 |

As seen in Table 2, azodicarbonamide was added to the elastomer during the master stage of mixing along with silica and other additives, such as zinc oxide, wax, stearic acid and antioxidant. The compounds were sheeted out immediately after the mixing. The cure times were determined by the t90 data from a Monsanto Rheometer (1.5× (time to reach t90 torque value)).

After the samples were cured, they were submitted for physical testing, in which the results are listed in Table 4.

TABLE 4

| | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| t50% [171° C. Cure] (min): | 2.33 | 3.35 | 3.66 | 2.11 | 2.39 | 2.75 | 1.35 | 1.67 | 1.74 | 2.68 | 4.16 | 4.24 |
| t90% [171° C. Cure] (min): | 5.02 | 8.58 | 8.82 | 3.19 | 5.84 | 6.33 | 2.01 | 3.60 | 3.71 | 4.68 | 9.48 | 9.49 |
| MH-ML (dNm) | 21.2 | 25.8 | 25.3 | 25.7 | 33.3 | 32.9 | 17.9 | 25.6 | 24.2 | 20.1 | 25.9 | 23.6 |
| $ML_{1+4}$ @ 130° C.: | 51.0 | 69.6 | 66.4 | 53.5 | 67.7 | 67.8 | 49.0 | 39.6 | 31.8 | 44.6 | 54.5 | 55.7 |
| Bound rubber (%) | 17.3 | 33.5 | 29.0 | 18.5 | 30.0 | 30.9 | 24.0 | 33.5 | 30.4 | 19.8 | 34.60 | 32 |
| G' [TS, 60° C., 10 Hz, 2%] (MPa): | 5.05 | 7.27 | 6.67 | 6.75 | 10.70 | 9.32 | 5.67 | 7.77 | 7.39 | 5.50 | 6.91 | 5.99 |
| Increase in G' at 60° C. (%): | ref | 44 | 32 | ref | 59 | 38 | ref | 37 | 30 | ref | 26 | 9 |
| tanδ [TS, 60° C., 10 Hz, 2%]: | 0.134 | 0.102 | 0.105 | 0.105 | 0.088 | 0.084 | 0.112 | 0.113 | 0.109 | 0.134 | 0.108 | 0.107 |
| Decrease in tanδ at 60° C. (%): | ref | 24 | 22 | ref | 16 | 20 | ref | −1 | 3 | ref | 19 | 20 |
| G' [SS, 60° C., 10 Hz, 5%] (MPa): | 3.82 | 4.31 | 4.18 | 4.56 | 5.66 | 5.59 | 3.25 | 3.78 | 3.43 | 3.53 | 4.04 | 3.88 |
| tanδ [SS, 60° C., 10 Hz, 5%]: | 0.160 | 0.113 | 0.113 | 0.114 | 0.109 | 0.090 | 0.158 | 0.127 | 0.131 | 0.158 | 0.131 | 0.125 |
| ΔG' [SS, 60° C., 10 Hz, 0.03%-15%] (MPa): | 3.46 | 2.96 | 2.69 | 3.64 | 4.94 | 3.91 | 4.29 | 4.03 | 3.61 | 3.01 | 3.18 | 2.68 |
| 50% Modulus @ 23° C. (MPa): | 1.98 | 2.64 | 2.27 | 2.43 | 3.02 | 2.74 | 1.72 | 2.34 | 2.13 | 1.83 | 2.35 | 2.21 |
| 200% Modulus @ 23° C. (MPa): | 7.64 | 12.69 | 10.40 | 8.66 | 12.24 | 10.78 | 7.87 | 11.75 | 10.70 | 7.67 | 12.36 | 11.3 |
| Tb, Stress at break @ 23° C. (MPa) | 11.40 | 11.90 | 10.70 | 16.00 | 11.40 | 11.40 | 26.50 | 19.90 | 23.40 | 18.30 | 15.3 | 14 |
| Eb, Strain at break @ 23° C. (%) | 269 | 188 | 202 | 330 | 189 | 209 | 504 | 314 | 378 | 374 | 234 | 235 |
| 50% Modulus @ 100° C. (MPa): | 1.93 | 2.61 | 2.34 | 2.50 | 3.10 | 2.87 | 1.65 | 2.28 | 2.05 | 1.79 | 2.38 | 2.23 |
| 200% Modulus @ 100° C. (MPa): | 7.00 | — | — | 7.82 | — | — | 5.93 | — | 8.00 | 7.12 | — | — |
| Tb, Stress at break @ 100° C. (MPa) | 7.30 | 6.70 | 5.70 | 8.80 | 6.80 | 7.10 | 16.60 | 8.60 | 6.50 | 9.10 | 7 | 5.7 |
| Eb, Strain at break @ 100° C. (%) | 207 | 133 | 129 | 223 | 130 | 145 | 490 | 190 | 163 | 2.42 | 140 | 128 |
| Tear strength @ 23° C. (N/mm) | 29.0 | 20.2 | 22.4 | 29.6 | 16.5 | 19.6 | 89.0 | 52.0 | 66.7 | 31.7 | 25.5 | 24.6 |
| Travel @ tear @ 23° C. (%) | 351 | 191 | 224 | 309 | 124 | 185.7 | 706 | 373 | 470 | 344 | 226 | 242 |
| Wet Stanley London | 34.2 | 32.2 | 32.0 | 31.0 | 31.2 | 30.8 | 45.2 | 40.2 | 41.0 | 39.2 | 38.8 | 40 |
| Lambourn Abrasion (25% slip) | 0.036 | 0.049 | 0.042 | 0.019 | 0.036 | 0.027 | 0.039 | 0.059 | 0.051 | 0.039 | 0.062 | 0.058 |

TABLE 4-continued

|  | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| Lambourn Abrasion (65% slip) | 0.047 | 0.069 | 0.054 | 0.023 | 0.046 | 0.038 | 0.059 | 0.081 | 0.073 | 0.066 | 0.082 | 0.084 |

A Rheometer was used to determine the cure characteristics of compounded rubbers. The procedure used to measure the cure of rubber samples follows ASTM D 2084. The sample size was 30 mm in diameter and 12.5 mm in thickness or equivalent to a volume of 8 cm$^3$. The equipment used was a Monsanto Rheometer Model MDR2000.

Modulus, tensile strength (Tb) (stress at maximum strain) and elongation at break (Eb) are measured generally according to ASTM D 412 (1998) method B. Vulcanized rubber test specimens are cut into the shape of a ring, using a D412 B Type 1 die. The measurements for the above properties are based on the original cross sectional area of the test specimen. An instrument equipped to produce a uniform rate of grip separation, such as an Instron tensile tester, with a suitable dynamometer and an indicating or recording system for measuring applied force is used in conjunction with a measurement of extension of the test specimen. Modulus (100% (M100) and 300% (M300)), tensile strength (TB) and elongation (EB) are calculated according to the calculations set forth in ASTM D412 (1998).

In addition, FIG. 1 graphically depicts the relationship between G' and tan delta in the Example 6-17 rubber compositions. As shown by the data, 50% and 200% modulus values at both 23° C. and 100° C. demonstrate significant enhancement in the Examples as opposed to the control Examples. These results indicate that azodicarbonamide stiffens the rubber compositions of the Examples while reducing the tan delta. These properties indicate both improved rolling resistance and handling/cornering in tire applications.

The curing data showed that the control Examples cured faster in comparison to the azodicarbonamide-added Examples.

Example 18

Swelling tests were performed on Examples 6-17 in order to relate the current results to cross-link density measurements.

|  | Volume fraction of swollen rubber (v$_r$) | Cross-link density (v$_l$) (mol/m$^3$) |
|---|---|---|
| Example 6 | 0.395 | 125 |
| Example 7 | 0.449 | 140 |
| Example 8 | 0.429 | 134 |
| Example 9 | 0.474 | 147 |
| Example 10 | 0.512 | 157 |
| Example 11 | 0.480 | 148 |
| Example 12 | 0.327 | 107 |
| Example 13 | 0.374 | 120 |
| Example 14 | 0.376 | 120 |
| Example 15 | 0.479 | 148 |
| Example 16 | 0.504 | 155 |
| Example 17 | 0.515 | 158 |

Cured rubber samples were swollen in heptane for three days and dried under vacuum overnight at 60° C. The volume fraction of the rubber in the swollen sample was then calculated by formula I. See "Use of χ as a Function of Volume Fraction of Rubber to Determine Crosslink Density by Swelling," Rubber Chem. And Tech., 76, 832-845 (2003), which is incorporated by reference herein. The volume fraction (depicted as v$_r$ in the following equation) was corrected for the weight fraction of the filler (ffil) in the compound and the weight fraction of the soluble polymer in heptane (fsol). The densities of the rubber and the solvent are expressed as dr and ds, respectively and Wd and Ws are the dry and swollen weights of the sample.

$$v_r = \frac{1}{1 + \frac{dr}{ds}\left(\frac{1-f_{sol}}{1-f_{sol}-f_{fil}}\right)\left(\frac{Ws}{Wd}-1\right)} \quad \text{I}$$

Equation II represents the crosslink density (v$_l$), is the linear fit of the data where swelling density is plotted versus the volume fraction of rubber in the swollen state and generated from tensile retraction method as disclosed in Hergenrother, W. L., "Determination of the Molecular-weight Between Cross-links of Elastomeric Blocks by Tensile Retraction Measurements," *J. of Appl. Polym. Scien.*, 32, 3039-3050 (1986), which is incorporated by reference herein.

$$v_l = 269.49 \theta r + 18.62 \quad \text{II.}$$

As a result of the crosslink experiments, the values are within approximately 10% of each other within each set of three Examples (6-8, 9-11, 12-14, and 15-17). This further confirms that the reduction in loss tangent (tan delta) and a gain in elastic modulus (G') simultaneously is due to the effect of the addition of azodicarbonamide.

The invention is not limited to only the above embodiments or examples. The claims follow.

What is claimed is:

1. A method for preparing a rubber composition comprising:
   mixing in one or more steps:
      a diene elastomer;
      an azodicarboxy compound; and
      a reinforcing filler;
      a mixing temperature being about 90° C. to about 140° C. in mixing steps in which the azodicarboxy compound is present;
   curing the composition;
   whereby the elastomer, azodicarboxy compound, and reinforcing filler may be added in a same mixing step or different mixing steps;
   wherein the cured composition is not foamed.

2. The method of claim 1, wherein the azodicarboxy compound is added in a step after the filler is added.

3. The method of claim 1, wherein the reinforcing filler is silica.

4. The method of claim 1, further comprising a curing step wherein the curing temperature is less than the decomposition temperature of the azodicarboxy compound.

5. The method of claim 4, wherein a cure time of the curing step is about 5 to about 30 minutes.

6. The method of claim 1, wherein the elastomer, a first amount of reinforcing filler, and azodicarboxy compound are added in a masterbatch mixing step, and a second amount of reinforcing filler is added in a remill mixing step.

7. The method of claim 1, wherein the azodicarboxy compound is added in a mixing step with a zinc containing compound.

8. A method for preparing a rubber composition comprising mixing:
- a diene elastomer;
- an azodicarboxy compound; and
- a reinforcing silica filler;
- curing the composition;
- wherein the composition's mixing temperature is kept below the decomposition temperature of the azodicarboxy compound in the composition;
- whereby the elastomer, azodicarboxy compound, and reinforcing filler may be added in a same mixing step or different mixing steps;
- wherein the cured composition is not foamed;
- wherein the composition does not include a reinforcing carbon black filler.

9. The method of claim 8, wherein the azodicarboxy compound has the structure of formula I:

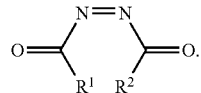

wherein $R^1$ and $R^2$ are independently selected from hydrogen or nitrogen containing compounds.

10. The method of claim 8, further comprising molding the composition into a tire component and curing the composition at a temperature less than the decomposition temperature of the azodicarboxy compound.

11. The method of claim 8, wherein the azodicarboxy compound is added in a mixing step with a zinc containing compound.

* * * * *